Patented Feb. 6, 1923.

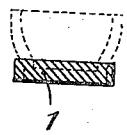
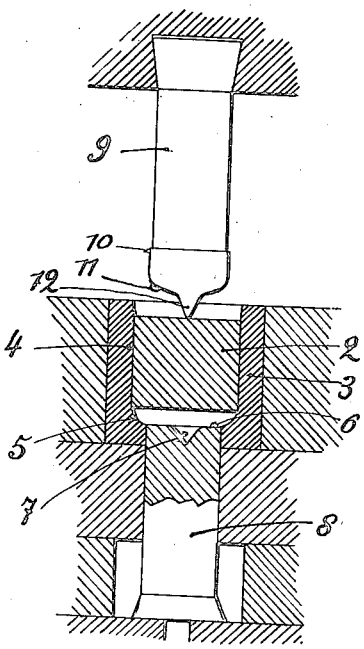
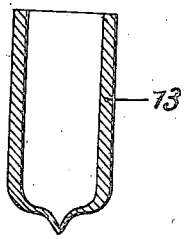

1,444,270

UNITED STATES PATENT OFFICE.

MAURICE PINCHART-DENY AND LUCIEN LABOUROT, OF PARIS, FRANCE.

PROCESS OF MANUFACTURE OF ROUGH PIECES FOR BRASS TUBES.

Application filed May 5, 1921. Serial No. 467,134.

*To all whom it may concern:*

Be it known that we, MAURICE PINCHART-DENY and LUCIEN LABOUROT, citizens of the Republic of France, and residing at Paris, Seine Department, 58 Rue Saint-Sabin, in the Republic of France, engineers, have invented certain new and useful Improvements in Processes of Manufacture of Rough Pieces for Brass Tubes, of which the following is a specification.

The rough pieces used for the manufacture of brass tubes consist of short and thick tubes which are supplied to the tube drawing operators who are engaged in the cold drawing process for the manufacture of tubes to be supplied to the industries, these having a variety of shapes and being made as a general rule with thin walls.

The rough pieces for iron or copper tubes are easily prepared by the first pass, in the hot state, by pressing or by the Mannesmann process. The ingot of the first pass is then drawn in elongated form in order to constitute the rough piece which is supplied to the operator occupied with the drawing process. This method may indeed be employed for iron and copper inasmuch as these metals may be readily worked both hot and cold, but the rough pieces for brass tubes are not susceptible of being produced in the hot state, since the qualities of brass which can be worked in the hot state can no longer be worked in the cold, and vice versa. In case an ingot of the first pass should be made of a brass susceptible of being worked in the hot state, or a poor quality of brass, such an ingot could not be made into tubes of any kind by the tube drawers. The various tubes manufactured by the cold drawn process are usually made from high grade brass of the first quality or what is termed cartridge quality, and this high grade brass cannot as a general rule be worked in the hot state as in the case of iron and copper.

For this reason, two methods of manufacture of rough pieces for brass tubes are commonly employed:

1. A disc is cut out of a rolled sheet of high grade brass, this disc being then pressed into a rough piece and then submitted to the drawing process. This process is however of a long and expensive nature.

2. The method makes use of a hollow cylindrical piece of cast brass of high grade, this being submitted to the drawing process together with the use of the mandrel.

In this case, the inner and outer surfaces of the rough piece produced by the casting process requires to be properly cleaned off. But in spite of the care which may be taken in this operation, the piece is subject to flaws, pitting and like defects which are the source of defective work during the drawing process. On the other hand, a method has been proposed for obviating the drawbacks inherent in the use of rough pieces in the shape of tubes which are cast or formed from cut out discs, by a direct manufacture of the brass tubes without the use of a rough piece at the commencement of the work. To this end it was sought to manufacture tubes of an indefinite length by pressing a cylindrical brass piece of a certain diameter through an annular aperture of considerably smaller diameter which is formed between a fixed matrix and a fixed die. A process of this kind is hardly available for use except in the treatment of metals of a very malleable or ductile character which do not become hardened by the drawing process, such for instance as tin, as is evidenced by the usual method of manufacture of tin tubes. But the process does not appear to be susceptible of industrial use in the case of metals of an inferior malleability and which are much subject to hardening during the drawing process such for instance as brass, by reason of the fact that the flow of the metal which takes place partly from the periphery towards the centre and partly from the centre towards the periphery, through a passage having a considerably smaller section than that of the piece under operation, requires the use of an extremely high pressure which produces an excessive strain upon the tools and gives rise to a molecular disaggregation, or in other words a destruction of the cohesion of the molecules of the metal which is prejudicial to the quality of the metal.

On the contrary, our invention relates to the manufacture of rough pieces for brass tubes, that is, hollow pieces which are to be submitted to the drawing process, and it has for its object to obtain rough pieces of this kind in a ready and economical manner and possessing excellent qualities as concerns their adaptability for the subsequent drawing process, being for this reason superior to the rough pieces produced by casting.

According to our invention, the rough piece for tubes is manufactured from high grade brass by the cold process, by making use of a solid cylindrical piece formed by casting and properly cleaned off, the diameter of the same being equal to that of the desired rough piece, and by submitting the said piece when cold to a high pressure by a suitable die and punch in such manner as to transform the piece by the flow of the brass around the said punch into a rough piece having a perfectly sound quality and consisting of compressed metal, and possessing the properties of rolled brass. The flow of the metal takes place through an annular passage whose outer diameter is the same as that of the said piece and whose section has the proper ratio to the section of the piece, this passage being formed by the cylindrical wall of the matrix and the specially shaped surface of the punch, these surfaces being so determined that the flow of the metal will take place exclusively from the centre towards the periphery without any sudden change in either direction or speed and without excessive contraction.

Under these conditions, the necessary pressure to be exerted upon the brass may be easily supported by the tools, and the molecular structure of the flowed metal is not herein subjected to any disaggregation whatever, but on the contrary is improved in quality and is especially adapted to undergo the subsequent drawing operations. It should be remarked that should a piece of metal which does not harden upon drawing, such as tin, be used under the same conditions, there would result no improvement in the qualities of this metal. The application of the said process to a metal which hardens by drawing, such as brass, will therefore give rise to a new and particular effect.

In the accompanying drawings,

Fig. 1 is a sectional view of a brass disc cut out of a sheet of rolled brass and used in the manufacture of a war rifle cartridge according to a known process.

Fig. 2 shows a vertical section of a solid brass piece and likewise a device for the manufacture of a rough piece for tubes according to this invention.

Fig. 3 is a vertical section of a rough piece formed from the said solid brass piece.

Figure 1 serves to illustrate the fact that in the manufacture of war rifle cartridges, there is formed by the first pass a rough piece for cartridge by forcing a circular disc 1 (Fig. 1) into a suitable matrix whereby the same is given the shape which is shown approximately by the dotted lines.

This process does not make use of a solid piece obtained by casting and suitably cleaned off, but employs a disc cut out of a piece of rolled sheet brass, that is, out of a piece of metal which has already been worked and hardened by rolling, and which is of a relatively expensive nature.

In the process according to our invention, the rough piece for tubes is prepared from a solid cylindrical piece of high grade brass (Fig. 2) having a relatively considerable height which is obtained by the casting process and is properly cleaned off. The said solid piece is disposed in a matrix 3 whose interior portion has the form of a cylindrical wall 4 which is somewhat enlarged at the upper part, of an annular plane portion 6 and of a conical recessed central portion 7.

These two last-named portions are preferably formed upon a movable rod 8 which serves to expel the rough piece from the matrix. The punch 9 is provided at the lower part with a cylindrical surface 10, an annular rounded surface 11 and a conical surface 12. The body of the said punch has preferably a somewhat smaller diameter than that of the surface 10 in order to obviate any useless friction between this member and the inner wall of the rough piece.

Upon applying a sufficiently high pressure, the punch is caused to penetrate into the solid piece 2 and it thereby forces the metal into the annular space between the surfaces 7, 6, 5 and 4 on the one hand and 12, 11, 10 on the other hand, in such manner as to cause the piece to finally assume the form of a hollow body 13, as shown in Fig. 3. The size and shape of the various parts are so determined that the flow of the metal shall take place with the greatest possible uniformity and without any disaggregation of the metal, and that the bottom of the rough piece shall possess only a small thickness in order to occasion as little waste of material as possible.

In practice, care is to be taken that the surfaces of punches and matrices shall have the proper configuration, by observing whether the punch is enabled to penetrate as far as the bottom of the solid piece under treatment; the required pressure should remain substantially constant, and the hardening effect practically uniform throughout the whole extent of the hollow cylinder which is thus produced. It should be observed that the conical or ogival form of the portion 12 of the said punch will effect the lateral repulsion of the molecules from the central part of the piece under treatment, and that the double curvature of the annular portion of the punch 11 will act to facilitate the gradual flow of the same towards the periphery. Only the lower part of the matrix is submitted to a high pressure, whereas the lateral walls which serve to maintain the metal in place and to guide the flow of the same, do not receive a very high pressure.

It will be furthermore observed that by the use of the hereinbefore described devices, the said punch is caused to move with reference to the matrix and it transmits the pressure which it receives directly to the portions of the metal situated adjacent the outflow section. It is obvious that the punch may be disposed in the fixed position and the matrix movable without any change in the operating conditions.

It is likewise possible, without departing from the principles of this invention, to make use of a matrix and a punch which are both in the stationary position, the metal being acted upon by means of a piston which is movable within the said matrix, or on the other hand a matrix and a punch may be caused to move together, in combination with a piston of fixed or movable disposition, although the arrangement hereinbefore described and represented is considered as preferable for this use.

Claims:

1. A process of manufacturing blanks for brass tubes consisting in the use of a cylindrical mass of cast brass, and in cold pressing said mass in a cylindrical matrix of the same diameter by means of a die having a cylindrical portion of smaller diameter than the cylindrical matrix and having its work engaging end rounded and terminating in a point.

2. An apparatus for the manufacture of blanks for brass tubes comprising in combination, a matrix with cylindrical walls and a bottom having at the central part a conical cavity and an annular portion connected by a curved surface with the said cylindrical wall, and a die having a cylindrical portion of smaller diameter than the matrix and having its work engaging end rounded and terminating in a point positioned in alinement with the conical cavity.

3. A process of manufacturing blanks for brass tubes consisting of providing a cylindrical matrix, placing therein in a cylindrical mass of cold metal, and forcing into the matrix a cylindrical die having its work engaging end rounded and terminating in a penetrating point at its center.

In testimony, that we claim the foregoing as our invention we have signed our names in presence of a subscribing witness.

MAURICE PINCHART-DENY.
LUCIEN LABOUROT.

Witness:
MAURICE ROUX.